United States Patent
Wang et al.

(10) Patent No.: US 10,927,023 B1
(45) Date of Patent: Feb. 23, 2021

(54) WHEY PREACID TREATMENT OF WASTEWATER WITH HIGH CALCIUM CONCENTRATION TO PROMOTE ANAEROBIC DIGESTION AND DELAY CALCIFICATION

(71) Applicant: GuangXi University, Nanning (CN)

(72) Inventors: Shuangfei Wang, Nanning (CN); Zhiwei Wang, Nanning (CN); Hui Liu, Nanning (CN); Chengrong Qin, Nanning (CN); Chen Liang, Nanning (CN); Xueping Song, Nanning (CN); Lianxin Luo, Nanning (CN); Xinliang Liu, Nanning (CN); Meiling Li, Nanning (CN)

( * ) Notice: Subject to any disclaimer, the term of this patent is extended or adjusted under 35 U.S.C. 154(b) by 0 days.

(21) Appl. No.: 16/936,515

(22) Filed: Jul. 23, 2020

(30) Foreign Application Priority Data

Aug. 1, 2019 (CN) .......................... 201910705494.6

(51) Int. Cl.
*C02F 3/28* (2006.01)
*C02F 1/66* (2006.01)
*C02F 1/68* (2006.01)
*C02F 103/28* (2006.01)

(52) U.S. Cl.
CPC ................. *C02F 3/28* (2013.01); *C02F 1/66* (2013.01); *C02F 1/68* (2013.01); *C02F 2103/28* (2013.01); *C02F 2209/02* (2013.01); *C02F 2209/06* (2013.01); *C02F 2305/00* (2013.01)

(58) Field of Classification Search
CPC .......... C02F 1/68; C02F 1/66; C02F 2305/00; C02F 2209/06; C02F 2103/28; C02F 2209/02
USPC .................................. 210/603, 614, 631, 928
See application file for complete search history.

(56) References Cited

U.S. PATENT DOCUMENTS

| | | | | |
|---|---|---|---|---|
| 4,666,605 A | * | 5/1987 | Minami | C02F 3/2806 210/603 |
| 6,830,696 B1 | * | 12/2004 | El-Shall | C02F 1/66 210/716 |
| 7,497,956 B2 | * | 3/2009 | Blais | C02F 11/143 210/721 |
| 2013/0319627 A1 | * | 12/2013 | Van Haute | D21C 3/18 162/161 |
| 2014/0342426 A1 | * | 11/2014 | Angelidaki | C12M 43/00 435/167 |

FOREIGN PATENT DOCUMENTS

EP            2886654 A1 * 6/2015

* cited by examiner

*Primary Examiner* — Fred Prince
(74) *Attorney, Agent, or Firm* — LeonardPatel PC

(57) ABSTRACT

A method may add whey to high calcium papermaking industrial wastewater blended and pre-acidification treatment to promote anaerobic reaction and inhibit calcification. The method includes, before anaerobic treatment of papermaking wastewater, mixing whey wastewater with the papermaking wastewater. The method also includes pretreating the papermaking wastewater by acidification to stabilize the papermaking wastewater prior to entering an anaerobic reaction system.

12 Claims, 1 Drawing Sheet

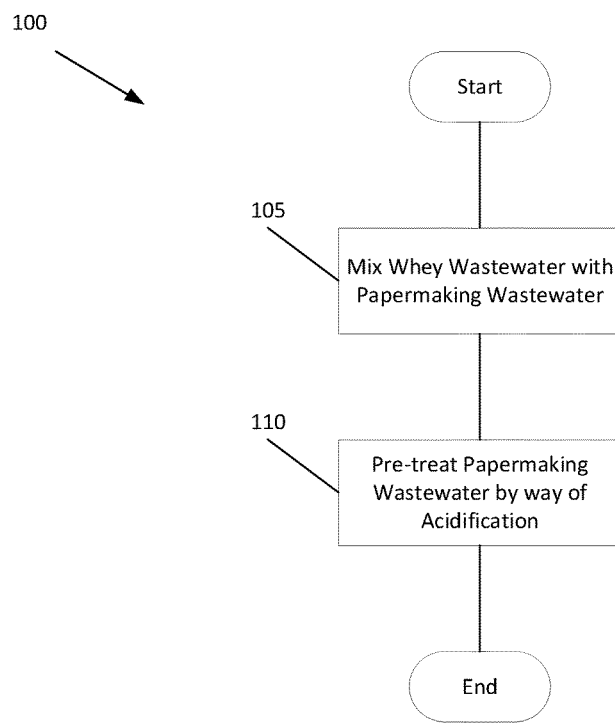

WHEY PREACID TREATMENT OF WASTEWATER WITH HIGH CALCIUM CONCENTRATION TO PROMOTE ANAEROBIC DIGESTION AND DELAY CALCIFICATION

CROSS-REFERENCE TO RELATED APPLICATION

This application claims the benefit of Chinese Patent Application No. 201910705494.6, filed on Aug. 1, 2019. The subject matter thereof is hereby incorporated herein by reference in its entirety.

FIELD

Some embodiments of the present invention generally pertain to light industry technology pulping and papermaking wastewater treatment, and more particularly, relate to a method that uses whey blended pre-acidification treatment high calcium papermaking industrial wastewater to promote anaerobic reaction and inhibit calcification.

BACKGROUND

In 2018, the global pulp production was 417.4 million tons and the waste pulp was 173.29 million tons. This accounted for 41.29% of total pulp, which is the most important raw material for papermaking. The waste pulp saves a lot of wood resources and significantly reduces environmental pollution. A large number of calcium carbonate ($CaCO_3$) fillers were added to reduce the cost, improve the opacity and smoothness of paper in the process of paper making, there are a lot of calcium ions in wastewater. In the process of anaerobic treatment, calcium salt is deposited on the surface, interior or pipeline of anaerobic granular sludge in the form of calcium carbonate. A large amount of calcium salt accumulation leads to a significant reduction in the activity of bacteria in sludge, which seriously affects the treatment capacity. With the increase of calcium ions, anaerobic granular sludge produces calcification, even lead to complete calcification. Due to the collapse of the entire anaerobic treatment system, enterprises need to change the granular sludge frequently, causing serious environmental pressure and economic loss. Enterprises also need to change granular sludge frequently, causing serious environmental pressure and economic loss when the anaerobic treatment system breaks down. Therefore, the inhibition of calcification improves the activity of anaerobic granular sludge and the stability of anaerobic reaction system. At the same time, the composition of high-calcium papermaking wastewater is complex, difficult to degrade, and the nutrient composition, such as nitrogen, phosphorus and potassium, is not balanced, sometimes some nutrients need to be added.

The whey wastewater is a by-product of milk factory. After the recovery of available protein, the chemical oxygen demand (COD) concentration of the residual wastewater is still 10000-30000 mg/L. There are a lot of protein, lactose, vitamins, and minerals in the wastewater, so it is very difficult to treat the wastewater alone, but it has high biological value. At same time, whey contains a large amount of organic and inorganic phosphorus, the average phosphorus content is 0.09%-0.2%, giving high calcium papermaking wastewater to provide balanced nutrients.

The most common method is preprocessing first, remove toxic and harmful substances initially, and anaerobic treatment. The purpose is to greatly reduce the organic load, improving the biodegradability of wastewater and creating favorable conditions for subsequent aerobic treatment. Therefore, the effect of anaerobic treatment has become the key point of the whole treatment system. Chemical method and sewage sludge method are used to treat the calcification of granular sludge in anaerobic reactor. Chemical method inhibits the calcification of granular sludge by adding chemical reagent, but the pH value in raw water is not be increased. The precipitate not only reduces the calcium in anaerobic reactor, but also ensure the stability of granular sludge structure. Calcified sludge was separated and decomposed by sewage sludge method, but the effect was not well.

SUMMARY

Certain embodiments of the present invention may provide solutions to the problems and needs in the art that have not yet been fully identified, appreciated, or solved by current light industry pulping and paper making technologies. For example, some embodiments of the present invention pertain to a method of adding waste whey to high calcium papermaking wastewater to promote anaerobic reaction and inhibit calcification of anaerobic granular sludge.

In some embodiments, the method uses whey pre-acid treatment of wastewater with high calcium concentration to promote anaerobic digestion and delay calcification. The method includes pre-acid treatment of papermaking wastewater with whey wastewater before anaerobic treatment.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a method for promoting anaerobic digestion and delay calcification, according to an embodiment of the present invention.

DETAILED DESCRIPTION OF THE EMBODIMENTS

In view of the shortcomings of the existing technology, some embodiments provide a method that uses whey blended pre-acidification treatment high calcium papermaking industrial wastewater to promote anaerobic reaction and inhibit calcification. The method may improve the pretreatment process of the methanation step. For example, acidification pretreatment is used to produce stable anaerobic reaction performance of high concentration wastewater under high organic load. Acidification pretreatment ensures the dynamic balance between acidification, achieving low and stable pH value (5.5-6.5), promoting the anaerobic reaction of papermaking industrial wastewater, and improving the efficiency of anaerobic methane production of wastewater. At the same time, acidification pretreatment inhibits the calcium deposition phenomenon when the pH is high.

In some embodiments, the method uses whey pre-acid treatment of wastewater with high calcium concentration to promote anaerobic digestion and delay calcification. The method includes pre-acid treatment of papermaking wastewater with whey before anaerobic treatment.

In some embodiments, the volume ratio of whey wastewater to papermaking wastewater is 1:10-15. This may allow for the nutrition of wastewater system to be more balanced, which is conducive to the metabolism, growth and reproduction of acidizing bacteria and subsequent methanogens.

Also, in some embodiments, the pre-acidification temperature is 25° C., and the pH value is 5.5-6.9. This may prevent propionic acid of product of acidolysis from inhibiting the subsequent methane production process.

In some further embodiments, the pre-acidification treatment is carried out in the pre-acidification tank, and the hydraulic retention time is controlled at 3-4 hours (h). Its function is to adjust the pre-acidification degree of papermaking wastewater, which is more conducive to the subsequent methane production and provides stable pH value.

In some additional embodiments, the pre-acidification tank is equipped with a stirring device, having a stirring speed of 170-200 revolutions per minute (RPM). The whey wastewater and papermaking wastewater are mixed evenly, and anaerobic granular sludge is in full contact with wastewater.

The beneficial effects of the embodiments are discussed in more detail below.

Some embodiments use the whey wastewater to mix with the wastewater of papermaking plant. The papermaking wastewater is pretreated by acidification, making the wastewater entering the anaerobic reaction system stable and easy to be treated. The acidification pretreatment has a low and stable pH value, which promotes anaerobic reaction of papermaking wastewater and inhibits calcium precipitation. For purposes of explanation, a low and stable pH value is the growth environment suitable for anaerobic bacteria in anaerobic granular sludge, i.e., the pH is 5.5-6.9 and lower than that of the original papermaking wastewater. At the same time, the whey wastewater provides necessary nutrients for anaerobic bacteria in the treatment of papermaking wastewater with relatively single component, and increases the activity of anaerobic reaction system. In this way, whey wastewater can be turned into treasure. For purposes of explanation, nutrients may be defined as organic materials and carbon, and treasure may be defined as whey wastewater being more fully utilized.

Pre-acidification treatment may improve the pretreatment process of methanation. For example, pre-acidification treatment produces stable anaerobic reaction performance of high concentration wastewater under high organic load. In addition, carbohydrates lead to the fermentation of lactic acid, ethanol, acetic acid and butyric acid at a low pH, which is easy to produce propionic acid. This is the speed limiting step of the whole methanation process. After pre-acidification, fermentation to propionic acid can be avoided, which can prevent propionic acid from inhibiting the subsequent methanogenesis process and microorganisms in the anaerobic reaction system.

After pre-acidification treatment, some of the calcium ions in the wastewater is precipitated, and is easy to be treated due to it not being in the anaerobic reactor. For example, due to high concentrations of calcium ion, only part of the reaction precipitates. The method described herein removes calcium ions to some extent. Entering the anaerobic treatment system, the calcium ion content is reduced due to pre-acidification treatment. Therefore, the calcification of granular sludge can be delayed, and the anaerobic reaction system can operate normally and improve benefit.

Implementation Embodiment 1

In some embodiments, the method uses whey pre-acid treatment of wastewater with high calcium concentration to promote anaerobic digestion and delay calcification. In this embodiment, the experiment is carried out under laboratory conditions, the total chemical oxygen demand (TCOD) concentration of raw water is 8000±536 mg/L, and the calcium ion concentration is 300±50 mg/L. The specific operation is as follows.

The pre-acidification tank is used to add papermaking industrial wastewater and waste whey. The waste whey is added from the lower end of the acidification tank through pipes. To balance the nutrition of wastewater system, the volume ratio of waste whey and papermaking industrial wastewater is 1:10, and the volume of pre acidification tank is 800 m3.

Further, in order to mix the papermaking wastewater and whey evenly, a mixing device is set in the pre-acidification tank, and the speed of the rotor is adjusted to 170 RPM.

The water temperature in the container is kept at 25° C., and pH was maintained at 5.5 after whey wastewater was added. In order to prevent propionic acid of product of acidolysis from significantly having inhibition effect on the subsequent methane production process at low pH. Put simply, to prevent propionic acid, acidolysis products of anaerobic granular sludge, significantly having inhibition effect on the subsequent methane production process at low pH is at or about 4.5. Further, when pH is low (i.e., lower than 4.5), the activity of anaerobic bacteria is weakened or even inhibited.

The hydraulic retention time in the pre-acidification tank is controlled at 3 h, which is used to regulate the pre-acidification degree of papermaking industrial wastewater. It is more conducive to the subsequent methane production.

After pre-acidification, the wastewater is added to the anaerobic reaction bottle for further anaerobic treatment. The TCOD removal rate was 70% after anaerobic reaction, and the TCOD was increased by 10% after pre-acidification. The COD of effluent (SCOD) was 500±34 mg/L, and the removal rate was 94±1%. The methane production was 0.38±0.03 $m^3/m^3 \cdot d$, the efficiency was increased by 30%. The calcium precipitation was 30%, and the retention rate was less than 10%, which was significantly lower than the original 25%. There was no obvious calcification within two years of operation, and the severe fluctuation of anaerobic system and the times of heavy sludge discharge were significantly reduced. The proportion of microorganism in granular sludge was VSS/TSS≥0.69. The degree of calcification was reduced, the stability of anaerobic reaction process was ensured, the methane production rate was significantly increased, the calcification of granular sludge was obviously delayed, and the enterprise benefit was improved.

Implementation Embodiment 2

In some embodiments, the method uses whey pre-acid treatment of wastewater with high calcium concentration to promote anaerobic digestion and delay calcification. The embodiment is carried out under paper mill conditions. The TCOD concentration of raw water is 8000±750 mg/L, and the calcium ion concentration is 350±43 mg/L. The operation is described in more detail below.

The wastewater from papermaking industry is added to the pre-acidification tank, and then a certain amount of whey wastewater is added. Because this paper mill has a certain distance from dairy processing and road conditions, which is not convenient for pipeline transportation, the whey wastewater is transported to the paper mill by tank truck and added from the lower end of pre-acidification pool. To balance the nutrition of wastewater system, the volume ratio of whey wastewater and papermaking wastewater is kept at 1:12, and the volume of pre-acidification tank is 1200 $m^3$.

In order to make the whey wastewater and papermaking wastewater mix evenly, a mixing device is set in the pre acidification tank, and the speed of the rotor is adjusted to 185 rpm.

The water temperature in the container is kept at 25° C., and pH was maintained at 6.2 after whey wastewater was added.

The hydraulic retention time in the pre-acidification tank is controlled at 4 h, which is used to regulate the pre-acidification degree of papermaking industrial wastewater. It is more conducive to the subsequent methane production and enhance the balance of anaerobic reaction system.

After pre-acidification treatment, the wastewater is added to the anaerobic reaction bottle for further anaerobic treatment. The TCOD removal rate was 75% after anaerobic reaction, and the TCOD was increased by 15% after pre-acidification. The SCOD was 335±30 mg/L, and the removal rate was 96±1%. The methane production was 0.45±0.04 $m^3/m^3 \cdot d$, the efficiency was increased by 50%. The calcium precipitation was 32%, and the retention rate was less than 8%, which was significantly lower than the original 20%. There was no obvious calcification within three years of operation, and the severe fluctuation of anaerobic system and the times of heavy sludge discharge were significantly reduced. The proportion of microorganism in granular sludge was VSS/TSS≥0.74. The degree of calcification was reduced, the stability of anaerobic reaction process was ensured, the methane production rate was significantly increased, the calcification of granular sludge was obviously delayed, and the enterprise benefit was improved.

Implementation Embodiment 3

In some embodiments, the method uses whey pre-acid treatment of wastewater with high calcium concentration to promote anaerobic digestion and delay calcification. The TCOD of the mixed solution of the pre-acidification tank is 8000±850 mg/L, and the calcium ion concentration is 400 mg/L. The papermaking wastewater is from the factory. The operation is described in more detail below:

The wastewater is added to the pre-acidification tank, and the whey wastewater of 4° C. cold storage is taken out and added to the pre-acidification tank. The volume ratio of whey wastewater to papermaking wastewater is 1:15.

In order to make it mix evenly, a mixing device is set in the pre-acidification tank, and the speed of the rotor is adjusted to 200 rpm.

The water temperature in the container is kept at 25° C., and pH is maintained at 6.9 after whey wastewater was added.

The hydraulic retention time in the pre-acidification tank is controlled at 4 h, which is used to regulate the pre-acidification degree of papermaking industrial wastewater.

After pre-acidification treatment, the wastewater is added to the anaerobic reaction bottle for further anaerobic treatment. The TCOD removal rate was 83±3% after anaerobic reaction, and the TCOD was increased by 20% after pre-acidification. SCOD was 260±40 mg/L, and the removal rate was 97±1%. The methane production was 0.48±0.04 $m^3/m^3 \cdot d$, the efficiency was increased by 60%, and the calcium precipitation was 35%. There was no obvious calcification within three months of operation, which ensures the stability of anaerobic reaction process. It can significantly improve the methane yield and delay the calcification of granular sludge.

In the anaerobic reaction without pre-acidification treatment, the removal rate of COD was about 60%. The methane production capacity and calcium precipitation effect were not obvious, and there was also instability of wastewater treatment system. After pre-acidification, the anaerobic reaction had been improved, and the performance parameters had been greatly improved. The most important anaerobic reaction process was stable. The content of calcium ions in the system is reduced, which is easy to eliminate and inhibit the calcification of granular sludge, so as to improve enterprise benefits.

According to the results of embodiments 1 to 3, the method of the invention promotes the anaerobic reaction through the pre-acidification treatment, and the anaerobic process is carried out stably. With the deepening of pre-acidification treatment, the pollutant treatment effect and calcium precipitation will be improved. When the processing time is 4 hours, the best results are as follows.

The TCOD removal rate was 83±3%, the effluent COD was 260±40 mg/L, the removal rate was 97±1%. The methane production was increased to 0.48±0.04 $mg/m^3 \cdot d$ and efficiency increased by 60%. Calcium precipitation increased to 35%. The results show that the anaerobic process become far more stable.

FIG. 1 is a flow diagram illustrating a method 100 for promoting anaerobic digestion and delay calcification, according to an embodiment of the present invention. Method 100 may begin at 105 with mixing whey wastewater with wastewater from a papermaking plant, and at 110, pre-treating the papermaking plant wastewater by acidification to stabilize the papermaking plant wastewater prior to entering an anaerobic reaction system.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of adding whey to papermaking industrial wastewater having a calcium ion concentration of at least 800 mg/L and pre-acidification treatment to promote anaerobic reaction and inhibit calcification, the method comprising:
   before anaerobic treatment of the papermaking industrial wastewater, mixing whey wastewater with the papermaking wastewater; and
   pre-treating the papermaking industrial wastewater by acidification to stabilize the papermaking wastewater prior to entering an anaerobic reaction system.

2. The method according to claim 1, the method comprising:
   adjusting the volume ratio of whey wastewater to papermaking industrial wastewater to 1:10-15.

3. The method according to claim 1, the method comprising:
   controlling the pre-acidification temperature to 25° C.; and
   controlling the pH value to 5.5-6.9.

4. The method according to claim 1, the method comprising: controlling the hydraulic retention time to 3-4 h, a pre-acidification treatment is carried out in a pre-acidification tank.

5. The method according to claim 1, the method further comprising:
   controlling a stir speed to 170-200 rpm in a stirring device used in the acidification pre-treatment.

6. A method for promoting anaerobic digestion and delaying calcification, the method comprising:
   adding papermaking plant wastewater to a pre-acidification tank;
   adding whey wastewater from a lower end of the pre-acidification tank through one or more pipes;
   mixing whey wastewater with wastewater from a papermaking plant to enhance production of a valuable digestion byproduct comprising of biogas; and
   pre-treating the papermaking plant wastewater by acidification to stabilize the papermaking plant wastewater prior to entering an anaerobic reaction system.

7. The method of claim 6, wherein the acidification pretreatment comprises a low and stable pH value between 5.5 and 6.9, promoting anaerobic reaction of the papermaking wastewater and inhibiting calcium precipitation to ensure that the biogas comprises characteristics including $CH_4$ and $CO_2$ content.

8. The method of claim 7, further comprising:
   after the pre-treating of the papermaking plant wastewater, precipitating calcium ions in the papermaking plant wastewater to reduce content of the calcium ions from the acidification in the papermaking plant wastewater.

9. The method of claim 7, wherein the whey wastewater provides nutrients for anaerobic bacteria in treatment of papermaking wastewater with a single component, and increases an activity of the anaerobic reaction system to enhance the production of the valuable digestion byproduct.

10. The method of claim 7, wherein, a volume ratio of the whey wastewater and the papermaking plant wastewater is 1:10, 1:12, or 1:15, and a volume of the pre-acidification tank is 800 m³ or 1200 m³, to balance nutrition of the mixed wastewater.

11. The method of claim 10, wherein the mixing of the whey wastewater and the papermaking plant wastewater is performed by a mixing device set in the pre-acidification tank having a rotor speed of 170, 185, or 200 rotations per minute (RPM).

12. The method of claim 7, further comprising:
   controlling the pre-acidification temperature to 25° C.; and
   controlling the pH value to 5.5-6.9.

* * * * *